B. G. UNRUH.
CATTLE YOKE.
APPLICATION FILED AUG. 14, 1913. RENEWED MAY 23, 1914.
1,123,040.
Patented Dec. 29, 1914.
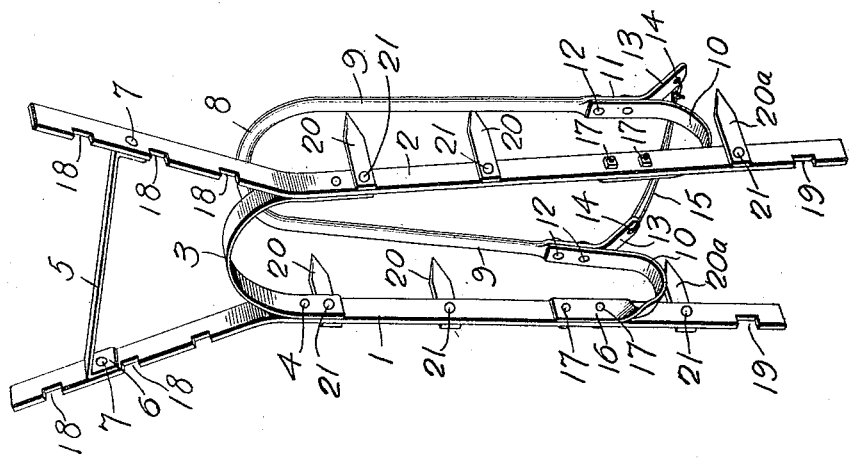
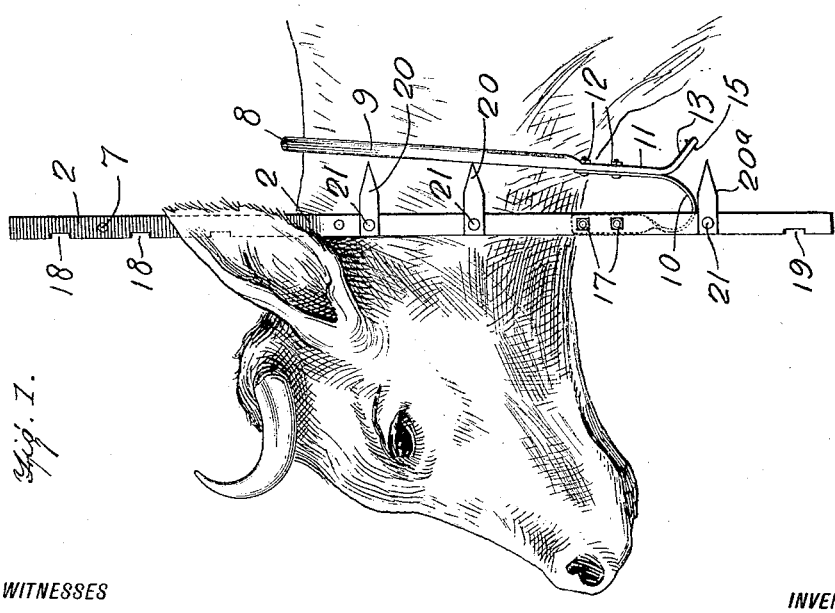
WITNESSES
INVENTOR
BENJAMIN G. UNRUH,
BY
ATTORNEYS

UNITED STATES PATENT OFFICE.

BENJAMIN GEORGE UNRUH, OF NESS CITY, KANSAS, ASSIGNOR OF ONE-HALF TO VOLNEY T. MILLER, OF NESS CITY, KANSAS.

CATTLE-YOKE.

1,123,040.  Specification of Letters Patent.  Patented Dec. 29, 1914.

Application filed August 14, 1913, Serial No. 784,752.  Renewed May 23, 1914.  Serial No. 840,608.

*To all whom it may concern:*

Be it known that I, BENJAMIN G. UNRUH, a citizen of the United States, and a resident of Ness City, in the county of Ness and State of Kansas, have invented a new and useful Improvement in Cattle-Yokes, of which the following is a specification.

My invention is an improvement in cattle yokes, and has for its object to provide a yoke of the character specified, that may be worn without injuring the animal's neck, and provided with mechanism for pricking the animal, the said mechanism being normally held out of position to engage the neck, but so arranged that when the yoke is engaged with a fence or other obstruction, the said mechanism may engage the neck, and wherein means is provided for engagement by the fence wires to prevent slipping of the said wires longitudinally of the yoke.

In the drawings: Figure 1 is a side view of the yoke in place, and Fig. 2 is a perspective view of the yoke detached.

The improved yoke is composed of a pair of similar bars 1 and 2, arranged in approximately parallel spaced relation, and connected intermediate their ends by an arch bar 3, the said bar having its ends lapped upon the inner faces of the bars 1 and 2, and secured thereto by means of rivets 4 or the like.

Above the arch bar 3, the ends of the bars 1 and 2 are bent laterally outward and diverge slightly from each other toward their free upper ends. Near the said ends the bars are connected by a cross bar 5, the ends of the said bar being bent downward as shown at 6, to lap upon the inner faces of the inclined portions of the bars, and being secured to the bars 1 and 2 by means of rivets 7. The bars 1 and 2 also diverge from each other slightly toward their lower ends, and the said arch bar 3 and the cross bar 5 are of strap iron, and arranged with their wide dimensions parallel. A yoke comprising a body 8 and arms 9 is arranged behind the bars 1 and 2, the body 8 of the said yoke being at approximately the level of the arch bar 3, and the arms 9 of the said yoke are directly behind the bars 1 and 2.

Each arm of the yoke is connected to the adjacent bar 1 or 2, as the case may be, by means of a U-shaped bracket 10. The lower end of each arm 9 of the yoke is flattened laterally as indicated at 11, and the free end of one arm of each of the brackets 10 is lapped upon the said flattened portions and secured thereto by means of bolts or nuts 12. The free end of each of the said flattened portions of the yoke is bent laterally away from the bars 1 and 2, as indicated at 13, and each of the said portions 13 is provided with an opening 14, near its free end. A cord or wire 15 or the like, connects the said portions 13, the cord being passed through the openings 14 in a manner to be presently described. The other arm of each of the brackets 10 is given a quarter turn as indicated at 16, and lapped upon the inner face of the adjacent bar 1 or 2, and bolts and nuts 17 are passed through the said arm and the adjacent bar 1 or 2, to secure the said arm to the bar.

Each of the bars 1 and 2 is provided with notches 18, above the arch bar 3, the said notches being in the front edge of the bar and the notches are arranged in spaced relation as shown. Near its lower end each of the said bars 1 and 2 is provided with a similar notch 19, and the notches of each bar are in register with the notches of the opposite bar. A series of spurs or lugs 20 and 20ª is secured to each of the bars 1 and 2, each of the said spurs or lugs having its free end pointed and being secured to the bar by rivets 21, or the like. The uppermost spur or lug is secured in place by one of the rivets 4 before mentioned, and the spur or lug 20ª of each bar is arranged below the bracket 10. The yoke member 8—9 is preferably of material circular in cross section and the arch thereof is somewhat lower than the arch bar 3, so that the portion 8 will engage the neck of the animal in rear of the engagement of the arch bar 3.

The improved yoke when constructed of metal should weigh not more than eight and one-half pounds, and of such weight that the said yoke is of sufficient strength to prevent jumping or crawling of the animal upon which it is used. It will be understood that the bars 1 and 2 are of such length, and the yoke and arch bar are so arranged with respect thereto, that the bars 1 and 2 will extend above the neck of the animal approximately the same distance as they will extend below the same.

When the animal attempts to jump over or crawl through a fence, the wires (if the fence is of wire) will engage the notches 18 and 19, and will press the yoke rearwardly toward the animal's shoulders. The brackets 10 are of resilient material, and the arms 9 of the yoke are arranged just outside of the spurs or lugs 20, so that the said spurs or lugs may pass the arms 9 of the yoke and may engage with their sharp points, the shoulders of the animal. Should the animal persist in its forward movement, the spurs will prick the animal and will soon cause it to desist from attempting to climb over or crawl through the fence. The notches 18 and 19 prevent the wires slipping over the ends of the bars, and thus prevent the animal from introducing first one end between the bars and then the other, pressing the wires apart, so that it may pass between them. The sides of the improved yoke are close to the neck, so that the animal may swing its head from side to side, without causing any pricking from the spurs or lugs. The yoke 8—9 will normally hold the spurs or lugs out of position to engage the shoulders, and it is only when pressure is made against the said bars to press them rearwardly that the spurs will be moved past the yoke. Immediately that the animal backs away from the fence the notches 18 and 19 will release the fence so that there is no possibility of the yoke catching in the wires and breaking them when the animal backs away from the fence.

The brackets 10 are of sufficient strength to normally hold the yoke in spaced relation with respect to the bars, yet there is sufficient resiliency to permit the movement of the bars above specified. The spurs 20ª are designed to engage the animal when the lower ends of the bars are engaged with the fence, thus preventing jumping as well as crawling. The yoke is held in place on the neck by means of the wire or cord 15. The yoke may be easily removed from the neck by loosening the cord or wire 15. When the said cord or wire is loosened, the yoke may be lifted directly upward away from the animal's neck.

I claim:—

1. A yoke of the character specified, comprising bars of rectangular cross section arranged in laterally spaced relation, an arch bar connecting the said bars intermediate the ends thereof, said bars diverging from each other above the arch bar and the said arch bar having its convex surface upward, a cross bar connecting the bars above the arch bar, a plurality of spurs or lugs secured to the said bars below the arch bar and extending rearwardly from the said bars, a yoke comprising a body and arms, each of the said arms having its lower end flattened and having the extremity of the lower ends bent backward at an angle to the arm and provided with an opening, a resilient U-shaped bracket comprising a body and arms, one of the arms being connected to the flattened portion of the yoke arm and the other arm to the adjacent bar of the pair, and a holding wire or cord engaging the openings of the arms and connecting the said arms, each of the bars of the pair having spaced notches above the arch bar and below the brackets.

2. A yoke of the character specified, comprising bars of rectangular cross section arranged in laterally spaced relation, an arch bar connecting the said bars intermediate the ends thereof, said bars diverging from each other above the arch bar and the said arch bar having its convex surface upward, a plurality of spurs or lugs secured to the said bars below the arch bar and extending rearwardly from the said bars, a yoke comprising a body and arms, the said yoke being spaced rearwardly of the pair of bars and with the body thereof at approximately the level of the arch bar, a resilient connection between the free end of each arm of the yoke and the adjacent bar of the pair, the arms of the yoke being out of register with the spurs to permit the spurs to pass the arms when the bars and yoke are pressed toward each other, and a releasable connection between the lower ends of the arms of the yoke, the bars of the pair having notches in their front edges.

3. A yoke of the character specified, comprising bars of rectangular cross section arranged in laterally spaced relation, an arch bar connecting the said bars intermediate the ends thereof, said bars diverging from each other above the arch bar and the said arch bar having its convex surface upward, a plurality of spurs or lugs secured to the said bars below the arch bar and extending rearwardly from the said bars, a yoke comprising a body and arms, the said yoke being spaced rearwardly of the pair of bars and with the body thereof at approximately the level of the arch bar, a resilient connection between the free end of each arm of the yoke and the adjacent bar of the pair, the arms of the yoke being out of register with the spurs to permit the spurs to pass the arms when the bars and yoke are pressed toward each other, and a releasable connection between the lower ends of the arms of the yoke.

BENJAMIN GEORGE UNRUH.

Witnesses:
CLAUD MILLER,
T. S. MOSHER.